United States Patent
Chen et al.

(10) Patent No.: US 9,011,024 B2
(45) Date of Patent: Apr. 21, 2015

(54) OPTICAL COMMUNICATION MODULE AND ASSEMBLING METHOD THEREOF

(71) Applicant: Delta Electronics, Inc., Taoyuan County (TW)

(72) Inventors: Hsiu-Ping Chen, Taoyuan County (TW); Hong-Bin You, Taoyuan County (TW); Chia-Kai Weng, Taoyuan County (TW)

(73) Assignee: Delta Electronics, Inc., Taoyuan County (TW)

( * ) Notice: Subject to any disclaimer, the term of this patent is extended or adjusted under 35 U.S.C. 154(b) by 137 days.

(21) Appl. No.: 13/796,934

(22) Filed: Mar. 12, 2013

(65) Prior Publication Data

US 2014/0086540 A1 Mar. 27, 2014

(30) Foreign Application Priority Data

Sep. 26, 2012 (TW) .............................. 101135267 A (51) Int. Cl.
*G02B 6/36* (2006.01)
*G02B 6/43* (2006.01)
G02B 6/42 (2006.01)

(52) U.S. Cl.
CPC .. *G02B 6/36* (2013.01); *G02B 6/43* (2013.01); Y10T 29/49117 (2015.01); G02B 6/4224 (2013.01); *G02B 6/425* (2013.01); G02B 6/4292 (2013.01)

(58) Field of Classification Search
CPC .... G02B 6/4228; G02B 6/243; G02B 6/4234; G02B 6/4224; G02B 6/4221; G02B 6/422
USPC .......................................................... 385/93
See application file for complete search history.

(56) References Cited

U.S. PATENT DOCUMENTS

| | | | | |
|---|---|---|---|---|
| 6,587,274 B1 * | 7/2003 | Border et al. | ................. | 359/619 |
| 6,739,766 B2 * | 5/2004 | Xu et al. | ........................ | 385/93 |
| 6,748,145 B2 * | 6/2004 | Border et al. | .................. | 385/52 |
| 6,765,603 B2 * | 7/2004 | Border et al. | ................. | 347/224 |
| 6,845,120 B2 * | 1/2005 | Border et al. | ................. | 372/107 |
| 6,987,619 B2 * | 1/2006 | Kornrumpf et al. | ......... | 359/619 |
| 7,578,623 B2 | 8/2009 | Wang et al. | | |

(Continued)

FOREIGN PATENT DOCUMENTS

| | | |
|---|---|---|
| JP | 2004096091 | 3/2004 |
| JP | 2004246279 | 9/2004 |

(Continued)

*Primary Examiner* — Rhonda Peace
(74) *Attorney, Agent, or Firm* — Kirton McConkie; Evan R. Witt (57) ABSTRACT

An optical communication module includes a substrate, a lens carrier, and a ferrule. The substrate includes at least two transmitter/receiver chips. The transmitter/receiver chips include plural optoelectronic units with respective alignment marks. The lens carrier includes a frame and a lens array. The lens array includes plural lens units corresponding to respective optoelectronic units of the transmitter/receiver chips of the substrate. The ferrule is coupled with the lens carrier. The alignment marks of the plural optoelectronic units are passively aligned with corresponding lens units, so that the lens carrier and the substrate are precisely aligned with each other and combined together. After the lens carrier and the substrate are combined together, the ferrule and the lens carrier are combined together, so that a precise optical communication path is constructed.

11 Claims, 9 Drawing Sheets

(56) References Cited

U.S. PATENT DOCUMENTS

| | | | |
|---|---|---|---|
| 7,612,881 B2* | 11/2009 | Ban et al. | 356/401 |
| 8,262,297 B2* | 9/2012 | Castagna et al. | 385/90 |
| 8,721,194 B2* | 5/2014 | Huang et al. | 385/93 |
| 2003/0091302 A1* | 5/2003 | Giboney et al. | 385/92 |
| 2003/0103739 A1* | 6/2003 | Brezina et al. | 385/93 |
| 2003/0117482 A1* | 6/2003 | Border et al. | 347/224 |
| 2003/0118071 A1* | 6/2003 | Border et al. | 372/50 |
| 2003/0118290 A1* | 6/2003 | Border et al. | 385/52 |
| 2003/0207479 A1* | 11/2003 | Border et al. | 438/22 |
| 2006/0147159 A1* | 7/2006 | Cheng et al. | 385/83 |
| 2007/0058904 A1* | 3/2007 | Ban et al. | 385/52 |
| 2011/0026882 A1* | 2/2011 | Budd et al. | 385/52 |
| 2012/0027345 A1* | 2/2012 | Castagna et al. | 385/33 |
| 2012/0027346 A1* | 2/2012 | Castagna et al. | 385/33 |
| 2013/0156386 A1* | 6/2013 | Miller | 385/93 |
| 2014/0086540 A1* | 3/2014 | Chen et al. | 385/89 |
| 2014/0093207 A1* | 4/2014 | Hofrichter et al. | 385/52 |
| 2014/0185995 A1* | 7/2014 | Lee et al. | 385/93 |

FOREIGN PATENT DOCUMENTS

| | | |
|---|---|---|
| JP | 2006-215288 | 8/2006 |
| JP | 2006309113 | 11/2006 |
| JP | 2007079090 | 3/2007 |
| JP | 2007171427 | 7/2007 |
| JP | 2007-324303 | 12/2007 |
| JP | 4512330 | 7/2010 |
| JP | 2011211152 | 10/2011 |
| JP | 2011247952 | 12/2011 |
| KR | 10-2006-0102848 | 9/2006 |
| TW | 591255 | 6/2004 |
| TW | I269895 | 1/2006 |
| TW | 200840060 | 10/2008 |
| TW | 201210010 | 3/2012 |

\* cited by examiner

OPTICAL COMMUNICATION MODULE AND ASSEMBLING METHOD THEREOF

FIELD OF THE INVENTION

The present invention relates to an optical communication module, and more particularly to an optical communication module with a lens carrier. The present invention also relates to a method of assembling the optical communication module.

BACKGROUND OF THE INVENTION

With the rapid development of information technology, the demands on information communication and transmission are gradually increased, and thus the demands on the data transmission speed and the bandwidth are correspondingly increased. For transmitting numerous data in the communication network, the optical communications industries of using photoelectric conversion to transmit signals are flourishing.

In the optical communications industries, optical signals are converted into electrical signals or electrical signals are converted into optical signals, and the converted optical/electrical signals are transferred through optical fibers. As known, the components in the optical transmission path should be precisely aligned with each other. If any one of the components is suffered from misalignment, the signal transmission and conversion may be erroneous. Under this circumstance, the output signals are erroneous or the output energy is lost. In other words, it is important to make precise alignment between the components in the optical transmission path.

Figure 1:
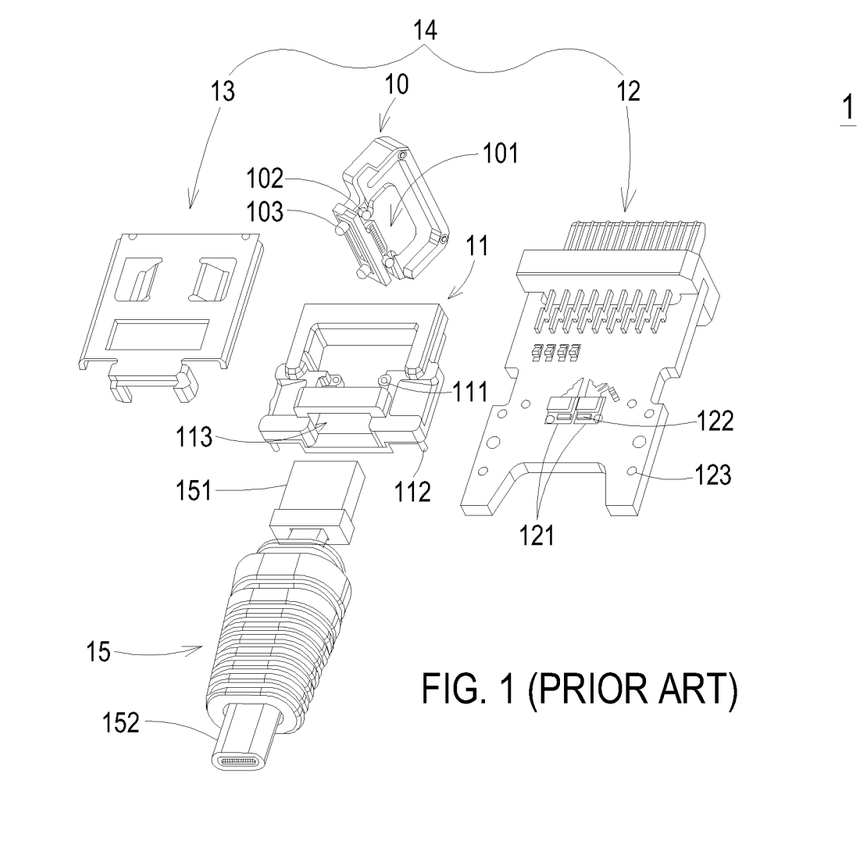
FIG. 1 is a schematic exploded view illustrating a conventional optical cable connecting mechanism.

For example, an optical cable connecting mechanism is disclosed in U.S. Pat. No. 7,578,623, which is entitled "Aligning lens carriers and ferrules with alignment frames". FIG. 1 is a schematic exploded view illustrating a conventional optical cable connecting mechanism, which is disclosed in U.S. Pat. No. 7,578,623. As shown in FIG. 1, the conventional optical cable connecting mechanism 1 comprises a connector assembly 14 and an optical cable termination 15. The connector assembly 14 comprises a lens carrier 10, an alignment frame 11, a circuit board 12, and an optional ferrule latch 13. An end of the optical cable termination 15 has a ferrule 151. The other end of the optical cable termination 15 is an optical cable 152. An integrated circuit chip 121 is disposed on the circuit board 12. An optoelectronic device 122 is disposed on the integrated circuit chip 121 for performing optoelectronic conversion. Plural lenses 101 are disposed on the lens carrier 10. A process of assembling the connector assembly 14 will be illustrated as follows. Firstly, the alignment frame 11 and the circuit board 12 are aligned and connected with each other. That is, the alignment pins 112 of the alignment frame 11 are mechanically inserted into corresponding pin openings 123 of the circuit board 12. Consequently, the alignment frame 11 is fixed on the circuit board 12. Then, the first fixing parts 102 of the lens carrier 10 are aligned with and inserted into corresponding fixing holes 111 of the alignment frame 11. Consequently, the lens carrier 10 is disposed on the alignment frame 11. Under this circumstance, the plural lenses 101 on the lens carrier 10 are aligned with the integrated circuit chip 121 of the circuit board 12. Then, the ferrule 151 of the optical cable termination 15 is aligned with the alignment frame 11 and the lens carrier 10. That is, the ferrule 151 of the optical cable termination 15 is penetrated through a receptacle 113 of the alignment frame 11 and aligned with the second fixing parts 103 of the lens carrier 10. Consequently, the ferrule 151 of the optical cable termination 15 is connected with the alignment frame 11 and the lens carrier 10. Afterwards, the alignment frame 11 and the lens carrier 10 are clamped by the optional ferrule latch 13. Consequently, more secure connection between the connector assembly 14 and the optical cable termination 15 can be made. Meanwhile, an optical communication path between the connector assembly 14 and the optical cable termination 15 is also constructed.

However, since the alignment frame 11, the lens carrier 10, the circuit board 12 and the optical cable termination 15 of the conventional optical cable connecting mechanism 1 are mechanically aligned during the assembling process, some drawbacks may occur. For example, if one of the components is shifted by an external force during the assembling process, the optical cable connecting mechanism 1 is readily suffered from misalignment. Moreover, if the optical cable connecting mechanism 1 does not have precise optical alignment, the photoelectric conversion is possibly unable to convert signals. Under this circumstance, the product yield or the product quality is impaired.

SUMMARY OF THE INVENTION

An object of the present invention provides an optical communication module and an assembling method thereof. The optical communication module includes a lens carrier and a substrate. The substrate comprises plural optoelectronic units, and the lens carrier comprises plural lens units corresponding to the optoelectronic units. For assembling the lens carrier with the substrate, the alignment marks of the optoelectronic unit are passively aligned with respective lens units, so that the precise alignment between the lens carrier and the substrate is achieved by using passive alignment method.

Another object of the present invention provides an optical communication module and an assembling method thereof. Due to the structures of a glue-guiding groove of the substrate and the glue-guiding region of the lens carrier, a glue-dispensing process may be simply performed to combine the substrate and the lens carrier together.

A further object of the present invention provides an optical communication module and an assembling method thereof. After a ferrule and a lens carrier are mechanically combined together, the combination of the lens carrier and the ferrule is clamped by a clipping element. Consequently, the three-dimensional stability of the optical communication module is enhanced, and the overall coupling performance of the optical communication module is increased.

In accordance with an aspect of the present invention, there is provided an optical communication module. The optical communication module includes a substrate, a lens carrier, and a ferrule. The substrate includes at least two transmitter/receiver chips. The transmitter/receiver chips include plural optoelectronic units with respective alignment marks. The lens carrier includes a frame and a lens array. The lens array includes plural lens units corresponding to respective optoelectronic units of the transmitter/receiver chips of the substrate. The ferrule is coupled with the lens carrier. The alignment marks of the plural optoelectronic units are passively aligned with corresponding lens units, so that the lens carrier and the substrate are precisely aligned with each other and combined together. After the lens carrier and the substrate are combined together, the ferrule and the lens carrier are combined together, so that a precise optical communication path is constructed.

In accordance with another aspect of the present invention, there is provided a method for assembling an optical communication module. Firstly, a substrate is provided. The substrate includes at least two transmitter/receiver chips. The transmitter/receiver chips include plural optoelectronic units with respective alignment marks. Then, a lens carrier is provided. The lens carrier includes a frame and a lens array, wherein the lens array includes plural lens units. Then, the lens carrier is placed on the substrate, so that the optoelectronic units of the substrate are aligned with respective lens units of the lens carrier. By monitoring whether the alignment marks of the plural optoelectronic units are aligned with respective lens units, the precise optical alignment is achieved. Then, a glue-dispensing process is performed to dispense a glue material into at least one glue-guiding groove of the substrate, so that the lens carrier is securely fixed on the substrate via the glue material. Afterwards, a ferrule is inserted into an insertion space of the lens carrier, so that the ferrule is connected with the lens carrier and a precise optical communication path is constructed.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 2:
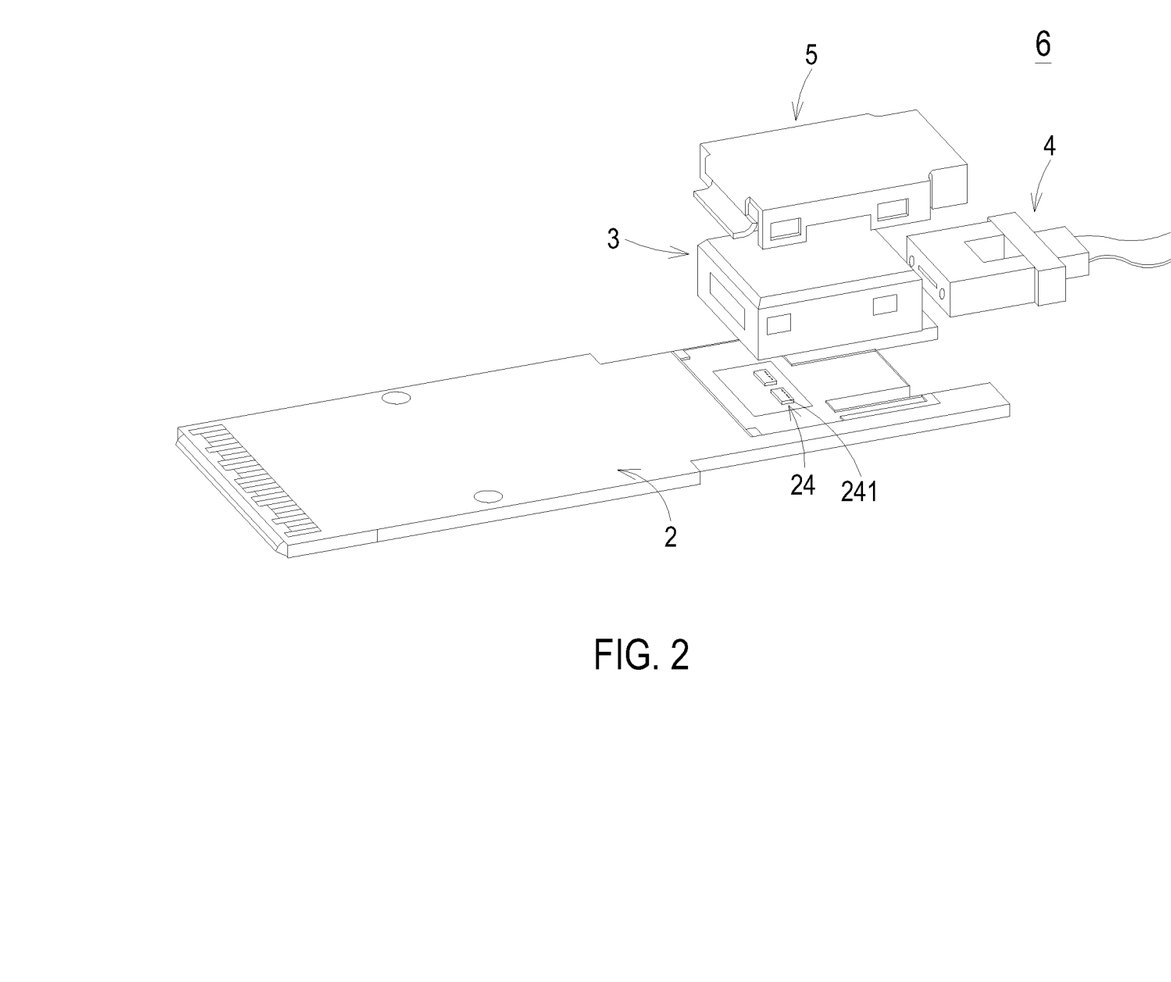
FIG. 2 is a schematic exploded view illustrating an optical communication module according to an embodiment of the present invention.

FIG. 2 is a schematic exploded view illustrating an optical communication module according to an embodiment of the present invention. As shown in FIG. 2, the optical communication module 6 comprises a substrate 2, a lens carrier 3, and a ferrule 4. Optionally, the optical communication module 6 further comprises a clipping element 5.

Moreover, at least two transmitter/receiver chips 24 (e.g. LD/PD chips) are disposed on the substrate 2. Each transmitter/receiver chip 24 comprises plural optoelectronic units 241, wherein each optoelectronic unit 241 has an alignment mark (not shown).

Figure 4A:
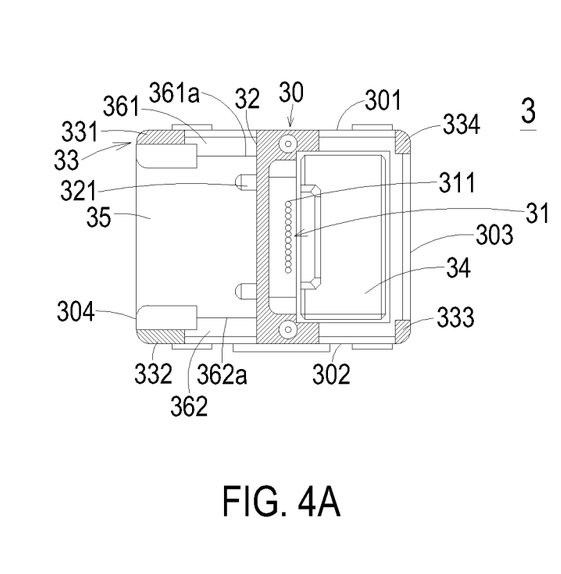
FIG. 4A is a schematic bottom view illustrating the lens carrier of the optical communication module as shown in FIG. 2.

The lens carrier 3 comprises a frame 30 and a lens array 31 (see FIG. 4A). The lens array 31 is disposed on the frame 30. The lens array 31 consists of plural lens units 311 (see FIG. 4A). The ferrule 4 is connected with the lens carrier 3.

Moreover, the optoelectronic units 241 of the transmitter/receiver chips 24 of the substrate 2 correspond to respective lens units 311 of the lens carrier 3. For assembling the lens carrier 3 with the substrate 2, the alignment marks of the optoelectronic units 241 are passively aligned with respective lens units 311. Consequently, the precise alignment between the lens carrier 3 and the substrate 2 can be achieved, and the lens carrier 3 and the substrate 2 can be successfully combined together. After the ferrule 4 and the lens carrier 3 are combined together, a precise optical communication path of the optical communication module 6 is constructed.

Figure 3:
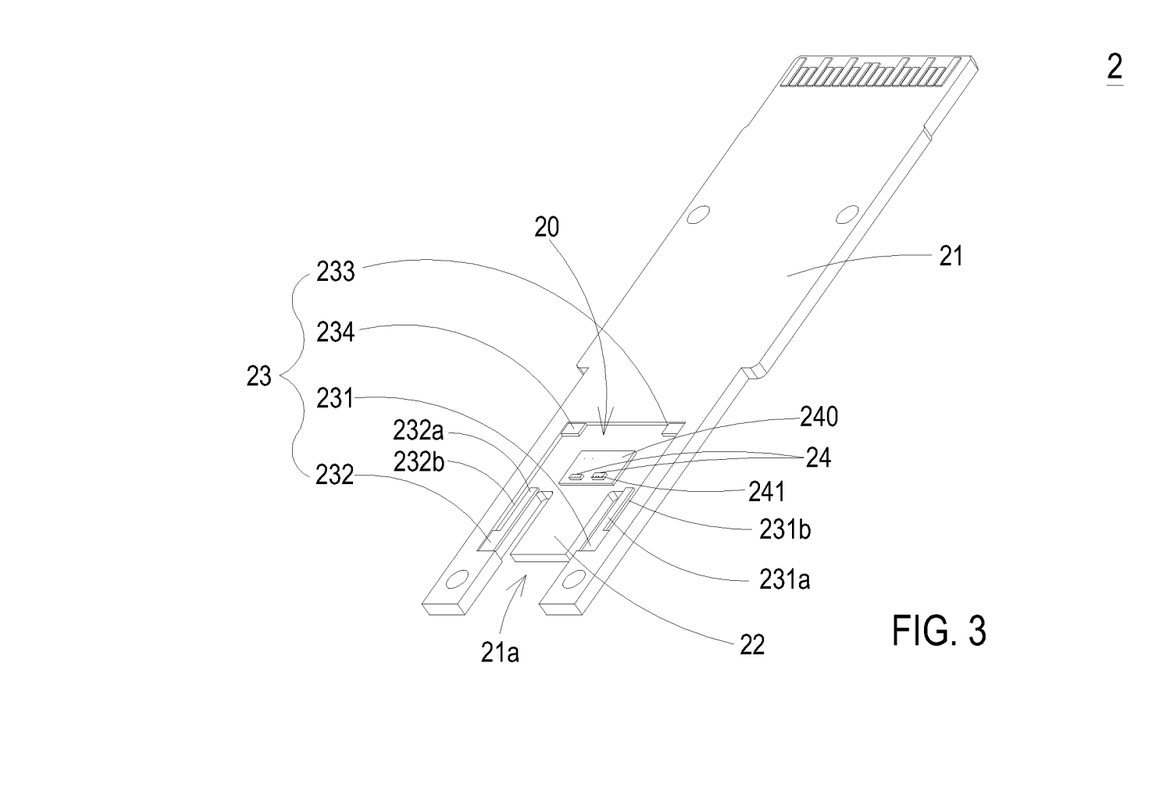
FIG. 3 is a schematic perspective view illustrating the substrate of the optical communication module as shown in FIG. 2.

FIG. 3 is a schematic perspective view illustrating the substrate of the optical communication module as shown in FIG. 2. An example of the substrate 2 includes but is not limited to a circuit board. The substrate 2 has a first surface 21, wherein plural circuits (not shown) are formed on the first surface 21 of the substrate 2. Moreover, a free end 21a of the first surface 21 has an optical alignment region 20. The optical alignment region 20 is substantially a rectangular concave structure, but is not limited thereto. That is, a second surface 22 of the optical alignment region 20 is at a lower level than the first surface 21 of the substrate 2. Moreover, plural contact parts 23 are located at the optical alignment region 20. In some embodiments, the plural contact parts 23 are convex structures. That is, the plural contact parts 23 are at a higher level than the second surface 22 of the optical alignment region 20.

In this embodiment, the plural contact parts 23 comprise a first contact part 231, a second contact part 232, a third contact part 233, and a fourth contact part 234. The first contact part 231, the second contact part 232, the third contact part 233 and the fourth contact part 234 are located at four corners of the optical alignment region 20, respectively. The first contact part 231 and the second contact part 232 are located near the free end 21a. Moreover, the first contact part 231 and the second contact part 232 have a first extension structure 231a and a second extension structure 232a, respectively. Moreover, a glue-guiding groove 231b is defined by the first extension structure 231a and the periphery of the optical alignment region 20, and another glue-guiding groove 232b is defined by the second extension structure 232a and the periphery of the optical alignment region 20.

Moreover, the at least two transmitter/receiver chips 24 are located at the optical alignment region 20. Each of the transmitter/receiver chips 24 is at a higher level than the second surface 22 of the optical alignment region 20. In some embodiments, a supporting plate 240 is arranged between the transmitter/receiver chips 24 and the second surface 22 of the optical alignment region 20 for supporting the transmitter/receiver chips 24 and assisting in the circuitry layout. Moreover, plural optoelectronic units 241 are disposed on each of the transmitter/receiver chips 24. For example, in this embodiment, four optoelectronic units 241 are disposed on each of the transmitter/receiver chips 24. It is noted that the number of the optoelectronic units 241 may be varied according to the practical requirements. An example of the alignment mark of each optoelectronic unit 241 includes but is not limited to a microstructure such as a graphic microstructure or a symbolic microstructure.

Figure 4B:
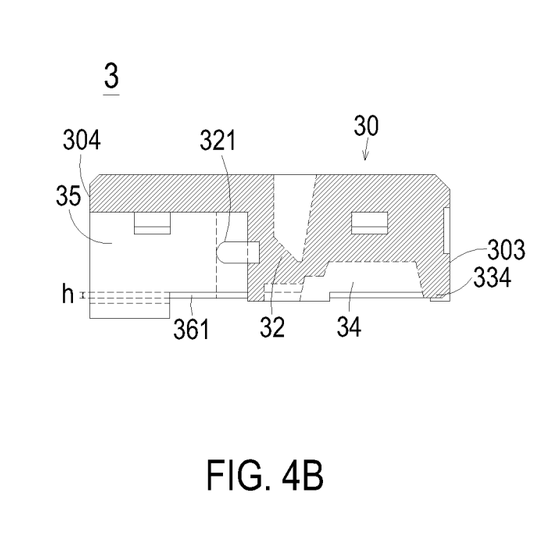
FIG. 4B is a schematic cross-sectional view illustrating the lens carrier of the optical communication module as shown in FIG. 2.
Figure 4C:
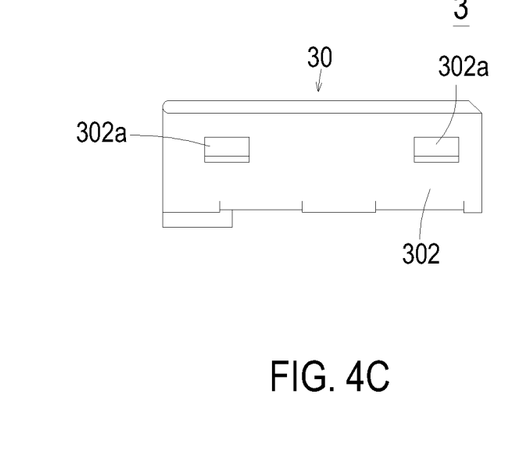
FIG. 4C is a schematic side view illustrating the lens carrier of the optical communication module as shown in FIG. 2.
Figure 4D:
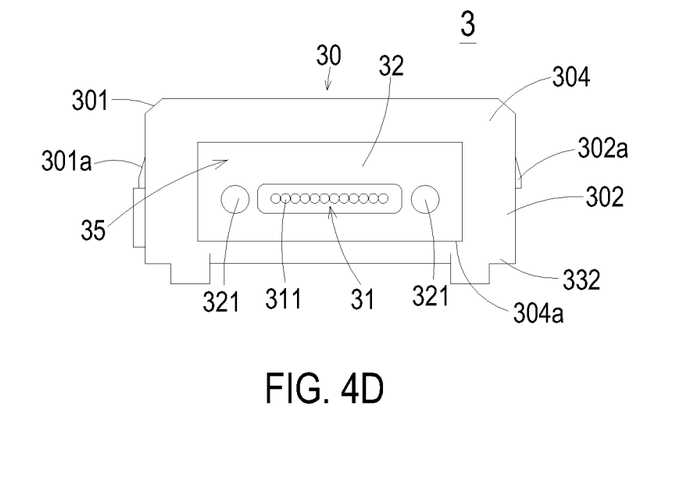
FIG. 4D is a schematic side view illustrating the lens carrier of the optical communication module as shown in FIG. 2 and taken along another viewpoint.

Next, please refer to FIGS. 4A-4D. FIG. 4A is a schematic bottom view illustrating the lens carrier of the optical communication module as shown in FIG. 2. FIG. 4B is a schematic cross-sectional view illustrating the lens carrier of the optical communication module as shown in FIG. 2. FIG. 4C is a schematic side view illustrating the lens carrier of the optical communication module as shown in FIG. 2. FIG. 4D is a schematic side view illustrating the lens carrier of the optical communication module as shown in FIG. 2 and taken along another viewpoint.

As shown in FIG. 4A, the lens carrier 3 comprises the frame 30 and the lens array 31. The lens array 31 is disposed on the frame 30. The lens array 31 consists of plural lens units 311 (see FIG. 4A). The frame 30 comprises a first side plate 301, a second side plate 302, a third side plate 303, and a fourth side plate 304. The first side plate 301 and the second side plate 302 are opposed to each other, and the third side plate 303 and the fourth side plate 304 are opposed to each other. In addition, both of the third side plate 303 and the fourth side plate 304 are connected with the first side plate 301 and the second side plate 302. Moreover, the lens carrier 3 further comprises a central plate 32. The central plate 32 is spanned across the first side plate 301 and the second side plate 302. The lens array 31 is disposed on the central plate 32. By the central plate 32, the inner space within the frame 30 is divided into a protecting space 34 and an insertion space 35 (see FIGS. 4A and 4B). The insertion space 35 is in communication with the surroundings. After the lens carrier 3 is combined with the substrate 2, the protecting space 34 may protect the circuitry of the substrate 2. Due to the protecting space 34, the possibility of causing damage of the electronic components or circuits of the substrate 2 will be minimized.

The central plate 32 further comprises at least one positioning part 321, which is extended toward the insertion space 35. In this embodiment, the central plate 32 comprises two positioning parts 321 corresponding to two guiding parts 401 of the ferrule 4 (see FIG. 6). In this embodiment, the positioning parts 321 are guide pins, and the guiding parts 401 are guiding holes. When a main body 40 of the ferrule 4 (see FIG. 6) is inserted into the insertion space 35 of the lens carrier 3, the positioning parts 321 and the guiding parts 401 are engaged with each other. Consequently, the coupling efficiency of the lens carrier 3 and the ferrule 4 will be enhanced. It is noted that the number and types of the positioning parts 321 and the guiding parts 401 may be varied according to the practical requirements.

In some embodiments, the central plate 32 of the frame 30 of the lens carrier 3 further comprises at least one alignment opening 322, but is not limited thereto. After the lens carrier 3 and the substrate 2 are combined together, a confirmation feature (not shown) of the substrate 2 corresponding to the alignment opening 322 may be checked through the alignment opening 322. Correspondingly, the precise coupling between the lens carrier 3 and the substrate 2 can be achieved.

Figure 5:
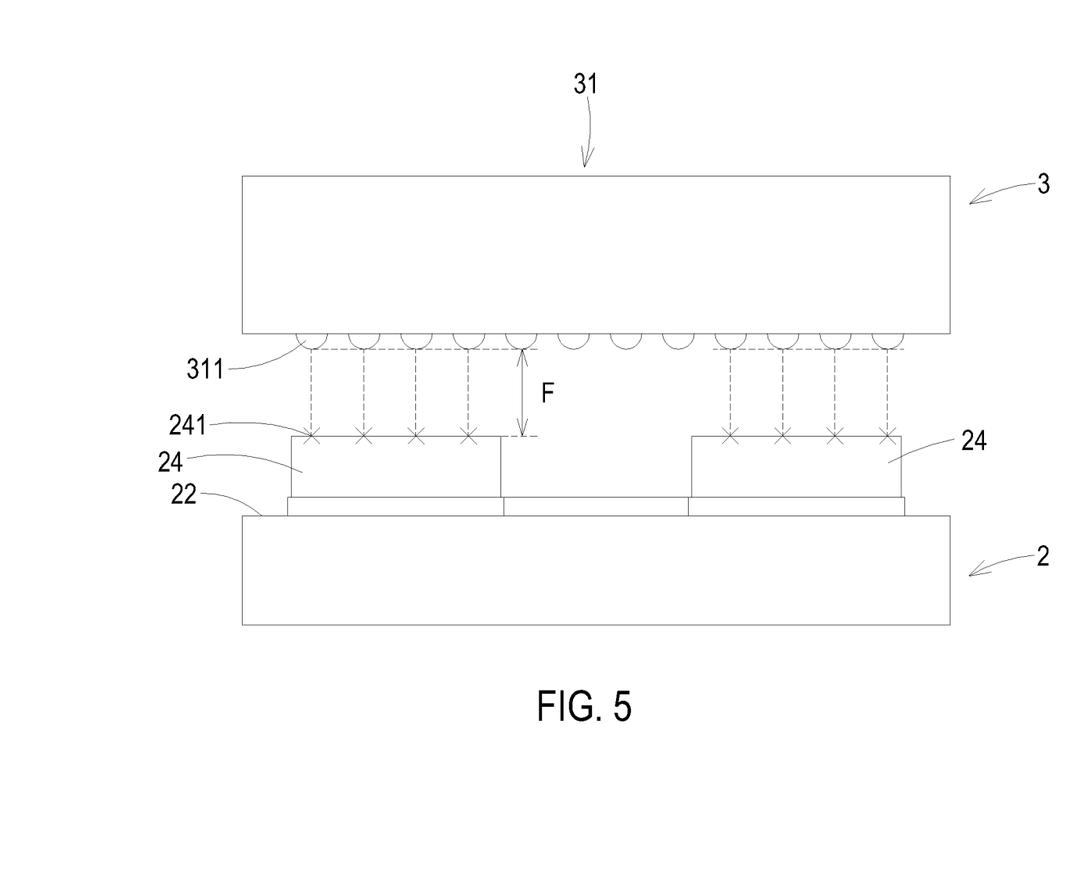
FIG. 5 is a schematic view illustrating the relationships between the lens units of the lens carrier and the optoelectronic units of the substrate.

Please refer to FIG. 4A again. The frame 30 of the lens carrier 3 further comprises plural additional contact parts 33 corresponding to the plural contact parts 23 of the substrate 2. The structures of the plural additional contact parts 33 are similar to those of the plural contact parts 23. For example, the plural additional contact parts 33 are also convex structures, but are not limited thereto. In this embodiment, the plural additional contact parts 33 comprise a fifth contact part 331, a sixth contact part 332, a seventh contact part 333, and an eighth contact part 334. The fifth contact part 331, the sixth contact part 332, the seventh contact part 333 and the eighth contact part 334 are located at four corners of the frame 30, respectively. In other words, the fifth contact part 331, the sixth contact part 332, the seventh contact part 333 and the eighth contact part 334 correspond to the first contact part 231, the second contact part 232, the third contact part 233 and the fourth contact part 234, respectively. Since the plural additional contact parts 33 of the lens carrier 3 and the plural contact parts 23 of the substrate 2 are all convex structures, after the lens carrier 3 and the substrate 2 are combined together (see FIG. 5), the plural additional contact parts 33 of the lens carrier 3 and corresponding contact parts 23 of the substrate 2 are contacted with each other. In such way, the plural lens units 311 of the lens array 31 of the lens carrier 3 are separated from respective optoelectronic units 241 of the transmitter/receiver chips 24 of the substrate 2 by a specified focusing distance F. Moreover, each optoelectronic unit 241 of the transmitter/receiver chips 24 has an alignment mark (e.g. the mark "x" as shown in FIG. 5). After the lens carrier 3 is disposed on the substrate 2, an observing device (e.g. a video camera) may be used to monitor whether the alignment mark of the optoelectronic unit 241 is projected onto a corresponding lens unit 311. If the use of the observing device confirms that the alignment marks of the optoelectronic unit 241 are projected onto corresponding lens units 311, it means that the lens carrier 3 and the substrate 2 are precisely aligned with each other. Under this circumstance, the optical path precision and the coupling yield of the lens carrier 3 and the substrate 2 can be simply and quickly achieved.

Please refer to FIGS. 4A and 4B again. Two glue-guiding regions 361 and 362 are located beside the inner walls of the first side plate 301 and the second side plate 302 and located near the fifth contact part 331 and the sixth contact part 332, respectively. The glue-guiding regions 361 and 362 are concavely formed in the frame 30 for accommodating a glue material (not shown). As shown in FIG. 4B, each of the glue-guiding regions 361 and 362 has a depth h relative to a bottom surface of the frame 30. In other words, the glue-guiding regions 361 and 362 may be considered as siphonal slits for resulting in a siphon effect of the glue material. During the lens carrier 3 and the substrate 2 are combined together, the glue material may be filled into the glue-guiding regions 361 and 362 through the siphon effect. Consequently, the glue material is in close contact with the inner walls of the siphonal slits. Under this circumstance, the adhesion between the glue material and the lens carrier 3 is enhanced, and thus the lens carrier 3 and the substrate 2 are securely fixed on each other.

In some embodiments, when the lens carrier 3 is disposed on the substrate 2, the inner edge 361a of the first extension structure 231a of the first contact part 231 and the inner edge 362a of the second extension structure 232a of the second contact part 232 are respectively contacted with the first contact part 231 and the second contact part 232 of the substrate 2. Consequently, during a glue-dispensing process is performed to combine the substrate 2 and the lens carrier 3 together, the glue material is only dispensed into the glue-guiding grooves 231b and 232b. In other words, the glue material is blocked by the first extension structure 231a and the second extension structure 232a, but is permitted to flow within the glue-guiding grooves 231b and 232b. Moreover, due to the siphonal slits of the glue-guiding regions 361 and 362 of the lens carrier 3, the glue material will be filled into the glue-guiding grooves 231b and 232b and the glue-guiding regions 361 and 362. Since the central plate 32 of the lens carrier 3 is also a convex structure, after the lens carrier 3 is disposed on the substrate 2, the flowable space of the glue material is limited by the central plate 32 of the lens carrier 3. Under this circumstance, the glue material is unable to flow to the transmitter/receiver chips 24 and the possibility of causing overflow of the glue material will be minimized. By means of the above components or structures, the lens carrier 3 and the substrate 2 can be securely fixed on each other by a simply glue-dispensing process.

Please refer to FIGS. 4A, 4C, 4D, 7A and 7B. The first side plate 301 and the second side plate 302 of the frame 30 of the lens carrier 3 have plural first engaging structures 301a and 302a. Corresponding to the plural first engaging structures 301a and 302a, a fifth side plate 51 and a sixth side plate 52 of the clipping element 5 have plural second engaging structures 511 and 521. In an embodiment, the first engaging structures 301a and 302a of the lens carrier 3 are resilient engaging bulges, and the second engaging structures 511 and 521 are indentions or slots. Due to the engagement between the first engaging structures 301a and 302a and the second engaging structures 511 and 521, the clipping element 5 is fixed on the lens carrier 3. It is noted that the first engaging structures and the second engaging structures may be varied according to the practical requirements.

Please refer to FIGS. 4A-4D again. The fourth side plate 304 of the frame 30 of the lens carrier 3 has an entrance 304a (see FIG. 4D). Through the entrance 304a, the insertion space 35 of the lens carrier 3 is in communication with the surroundings. Moreover, the central plate 32 of the lens carrier 3 is located at an inner bottom side of the insertion space 35. In other words, the lens array 31 and the lens units 311 on the central plate 32 of the lens carrier 3 and the positioning parts 321 at bilateral sides of the lens array 31 can be seen through the entrance 304a.

Figure 6:
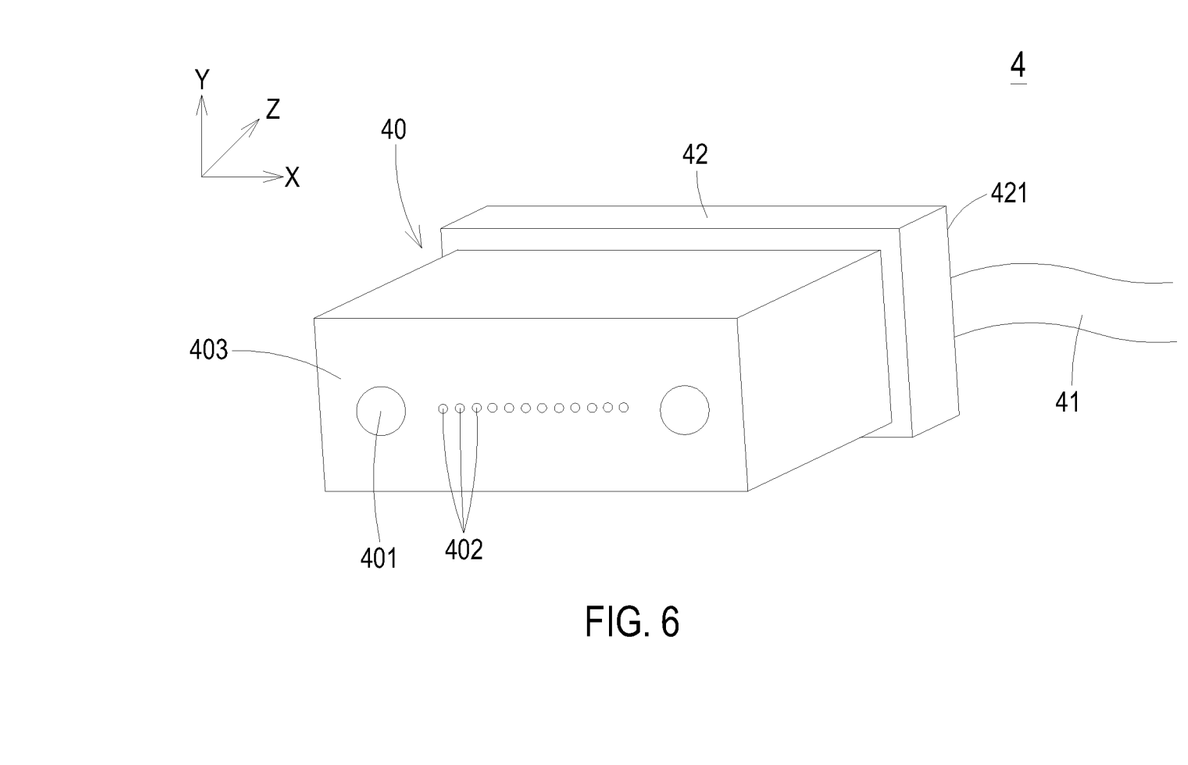
FIG. 6 is a schematic assembled view illustrating the ferrule of the optical communication module as shown in FIG. 2.

FIG. 6 is a schematic assembled view illustrating the ferrule of the optical communication module as shown in FIG. 2. As shown in FIG. 6, the ferrule 4 comprises a main body 40 and an optical cable 41. The main body 40 is a substantially a rectangular box structure, but is not limited thereto. The length and the width of the rectangular box structure match the length and the width of the entrance 304a of the insertion space 35 of the lens carrier 3. When the ferrule 4 and the lens carrier 3 are combined together, the main body 40 of the ferrule 4 is fitted into the insertion space 35 of the lens carrier 3. Consequently, the stability of the main body 40 of the ferrule 4 along the X-axis direction and the Y-axis direction will be enhanced. Under this circumstance, the ferrule 4 is not towed by the optical cable 41 to be rocked in the left direction or the right direction. Consequently, the stability of the optical communication module is enhanced. Moreover, due to the structures of the insertion space 35 of the lens carrier 3 and the main body 40 of the ferrule 4, the ferrule 4 can be quickly inserted into the insertion space 35 of the lens carrier 3 without a mechanical screwing means or any other complicated fixing means. In other words, the way of combining the ferrule 4 with the lens carrier 3 is simplified.

In this embodiment, the main body 40 of the ferrule 4 further comprises a frame part 42. The frame part 42 is located near the optical cable 41. The frame part 42 has a third surface 421. The optical cable 41 is connected with the third surface 421 of the frame part 42. Moreover, the main body 40 of the ferrule 4 further comprises a terminal surface 403, which is opposed to the optical cable 41. The two guiding parts 401 and plural optical cable terminals 402 are located at the terminal surface 403 of the ferrule 4. In this embodiment, the guiding parts 401 are guiding holes corresponding to the positioning parts 321 of the lens carrier 3. Moreover, the positions and numbers of the guiding parts 401 correspond to the positioning parts 321 of the lens carrier 3. The positions and numbers of the optical cable terminals 402 correspond to the lens units 311 of the lens carrier 3. Consequently, after the main body 40 of the ferrule 4 is inserted into the insertion space 35 of the lens carrier 3, the positioning parts 321 of the lens carrier 3 and the guiding parts 401 are aligned with each other, and the optical cable terminals 402 of the ferrule 4 and the lens units 311 of the lens carrier 3 are aligned with each other. By mechanically combining the guiding parts 401 with the positioning parts 321 and combining the main body 40 of the ferrule 4 with the insertion space 35 of the lens carrier 3, the ferrule 4 and the lens carrier 3 are combined together. Consequently, the stability of the main body 40 of the ferrule 4 along the X-axis direction and the Y-axis direction will be enhanced. Under this circumstance, even if a tiny assembling shift, the optical communication between the optical cable terminals 402 and the lens units 311 will not be adversely affected. Since the optical cable terminals 402 of the ferrule 4 and the lens units 311 of the lens carrier 3 are precisely aligned with each other, the precise optical path between the lens carrier 3 and the ferrule 4 is constructed.

Moreover, by means of the clipping element 5 of the optical communication module 6 (see FIG. 7A), the lens carrier 3 and the ferrule 4 can be securely combined together. It is noted that numerous modifications and alterations may be made while retaining the teachings of the invention. For example, the top end of a fourth side surface 304 of the lens carrier 3 may be provided with an engaging structure (not shown). After the main body 40 of the ferrule 4 is inserted into the insertion space 35 of the lens carrier 3, the engaging structure may be engaged with the third surface 421 of the frame part 42 of the ferrule 4. Consequently, the stability of the connection between the ferrule 4 and the lens carrier 3 along the Z-axis direction will be enhanced. In this embodiment, the clipping element 5 is used to enhance the stability of the connection between the ferrule 4 and the lens carrier 3 along the Z-axis direction.

Figure 7A:
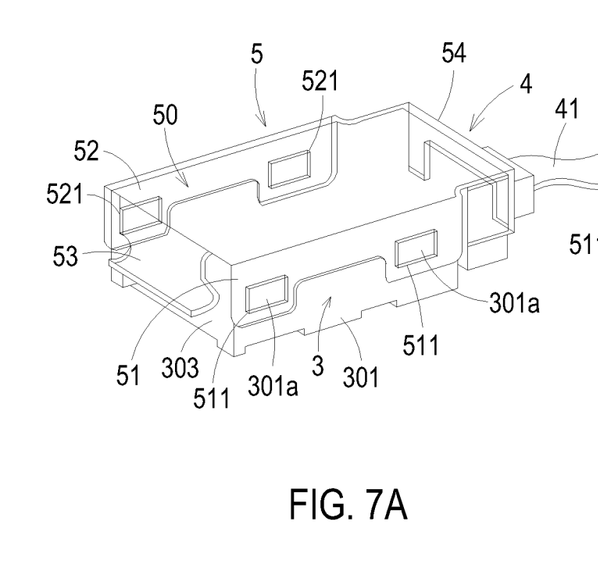
FIG. 7A is a schematic assembling view illustrating the combination of the clipping element, the lens carrier and the ferrule of the optical communication module as shown in FIG. 2.
Figure 7B:
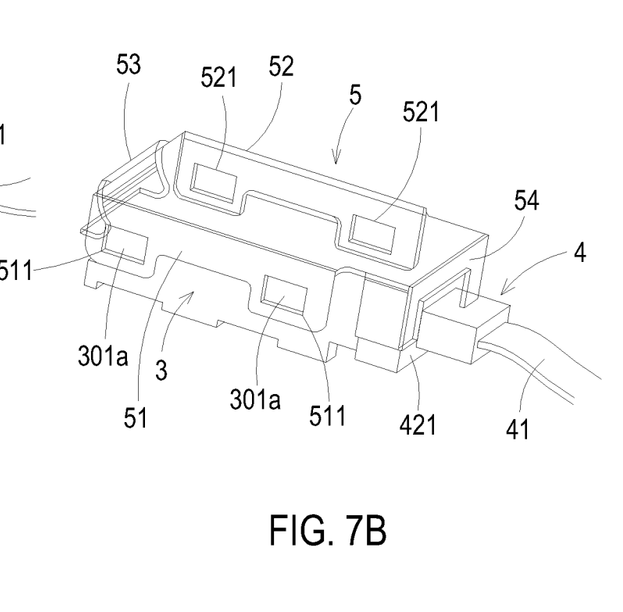
FIG. 7B is a schematic assembling view illustrating the combination of FIG. 7A and taken along another viewpoint.

FIG. 7A is a schematic assembling view illustrating the combination of the clipping element, the lens carrier and the ferrule of the optical communication module as shown in FIG. 2. FIG. 7B is a schematic assembling view illustrating the combination of FIG. 7A and taken along another viewpoint. The clipping element 5 comprises the fifth side plate 51, the sixth side plate 52, a seventh side plate 54, and an eighth side plate 50. The fifth side plate 51 and the sixth side plate 52 are opposed to each other. The seventh side plate 54 is connected with the fifth side plate 51 and the sixth side plate 52. The clipping element 5 further comprises a resilient sheet 53, which is located at the side opposed to the seventh side plate 54. The resilient sheet 53 is an elastic structure to be elastically attached on the third side plate 303 of the lens carrier 3. Corresponding to the plural first engaging structures 301a and 302a of the frame 30 of the lens carrier 3, the fifth side plate 51 and the sixth side plate 52 of the clipping element 5 have plural second engaging structures 511 and 521. After the lens carrier 3 and the ferrule 4 are combined together, the combination of the lens carrier 3 and the ferrule 4 can be further clamped by the clipping element 5. In other words, the second engaging structures 511 and 521 on the fifth side plate 51 and the sixth side plate 52 of the clipping element 5 and the first engaging structures 301a and 302a on the first side plate 301 and the second side plate 302 of the lens carrier 3 are engaged with each other. In addition. The resilient sheet 53 is elastically attached on the third side plate 303 of the lens carrier 3. In addition, the seventh side plate 54 of the clipping element 5 is contacted with the third surface 421 of the frame part 42 of the ferrule 4. In other words, the lens carrier 3 and the ferrule 4 are clamped by the four sides of the clipping element 5. Consequently, the structural strength of the lens carrier 3 and the ferrule 4 can be enhanced. Under this circumstance, the optical communication between the lens carrier 3 and the ferrule 4 can withstand the shock of the external force.

Figure 8:
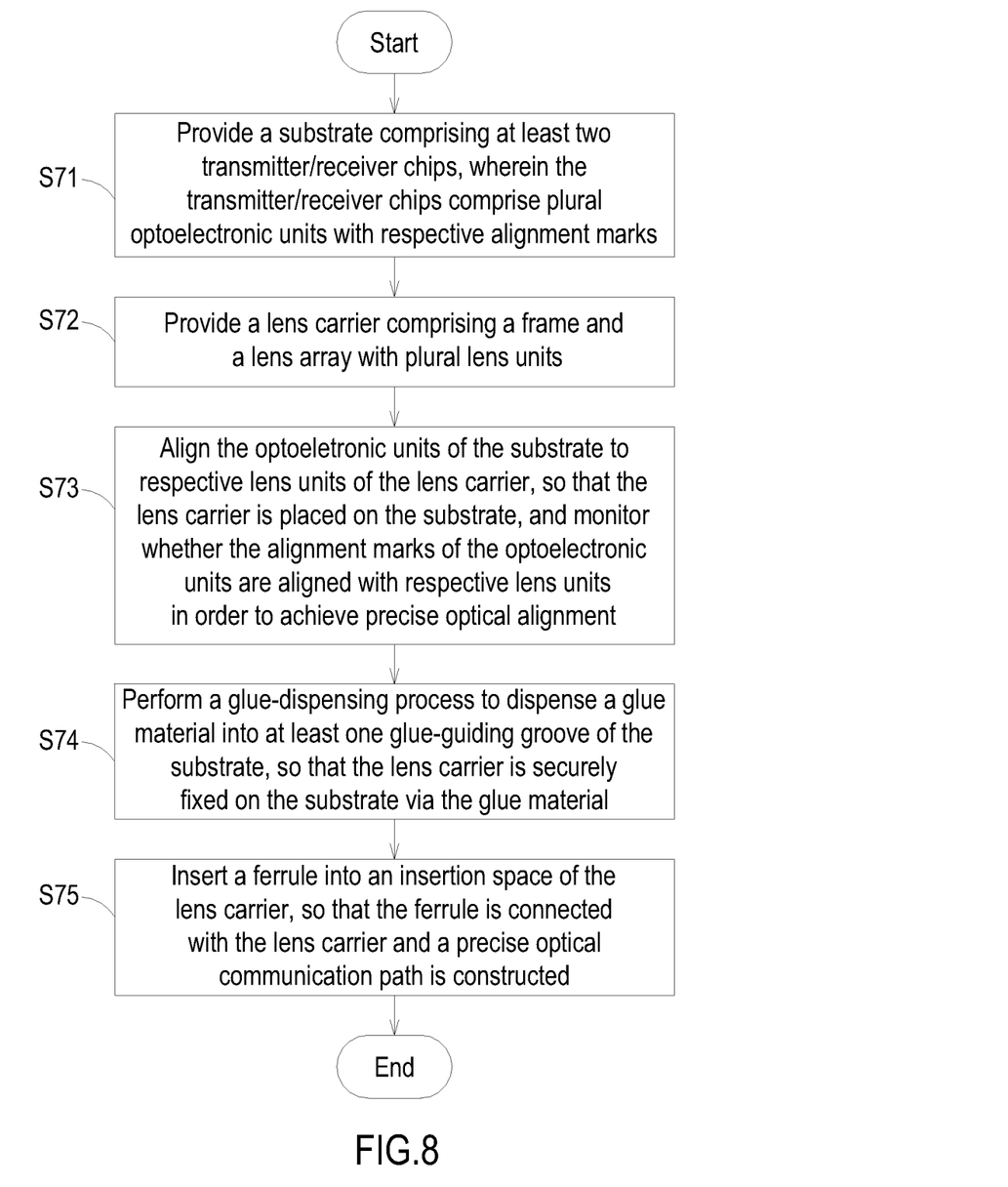
FIG. 8 is a flowchart illustrating a method of assembling an optical communication module according to an embodiment of the present invention.

Hereinafter, a method of assembling the optical communication module 6 will be illustrated with reference to FIG. 8. FIG. 8 is a flowchart illustrating a method of assembling an optical communication module according to an embodiment of the present invention. Firstly, in the step S71, a substrate 2 as shown in FIG. 3 is provided. The substrate 2 comprises at least two transmitter/receiver chips 24. Each of the transmitter/receiver chips 24 comprises plural optoelectronic units 241, wherein each of the plural optoelectronic units 241 has an alignment mark. Then, in the step S72, a lens carrier 3 as shown in FIG. 4A is provided. The lens carrier 3 comprises a frame 30 and a lens array 31. The lens array 31 comprises plural lens units 311. Then, in the step S73, the lens carrier 3 is placed on the substrate 2, so that the optoelectronic units 241 of the substrate 2 are aligned with respective lens units 311 of the lens carrier 3. In addition, by monitoring whether the alignment marks of the optoelectronic units 241 are aligned with respective lens units 311, the precise optical alignment between the lens units 311 and the optoelectronic units 241 can be realized. According to the monitoring result, the alignment adjustment is done in order to achieve precise optical alignment between the lens units 311 and the optoelectronic units 241. Then, in the step S74, a glue-dispensing process is performed to dispense a glue material into the glue-guiding grooves 231b and 232b of the substrate 2 (see FIG. 3). Through the siphon effect generated by the glue-guiding regions 361 and 362 of the lens carrier 3 (see FIGS. 4A and 4B), the lens carrier 3 is securely fixed on the substrate 2 via the glue material. Then, in the step S75, the ferrule 4 as shown in FIG. 6 is inserted into the insertion space 35 of the lens carrier 3, so that the ferrule 4 is connected with the lens carrier 3. Under this circumstance, the lens units 311 of the lens carrier 3 and the optical fibers of the ferrule 4 are in optoelectronic communication. In a case that the optical communication module 6 further comprises the clipping element 5, after the step S75, the assembling method of the optical communication module 6 may further comprises a step of clipping the lens carrier 3 and the ferrule 4 by the clipping element 5, so that the assemblage of the optical communication module 6 is more secure.

From the above descriptions, the present invention provides an optical communication module and an assembling method thereof. The optical communication module mainly comprises a substrate, a lens carrier and a ferrule. The substrate comprises plural optoelectronic units, and the lens carrier comprises plural lens units corresponding to the optoelectronic units. For assembling the lens carrier with the substrate, the alignment marks of the optoelectronic unit are passively aligned with respective lens units, so that the precise alignment between the lens carrier and the substrate is achieved. Moreover, due to the structures of a glue-guiding groove of the substrate and the glue-guiding region of the lens carrier, a glue-dispensing process may be simply performed to combine the substrate and the lens carrier together. Moreover, since the glue material is in close contact with the inner walls of the siphonal slits, the adhesion between the glue material and the lens carrier is enhanced, and the lens carrier and the substrate are securely fixed on each other. After the ferrule and the lens carrier are mechanically combined together, the combination of the lens carrier and the ferrule is clamped by a clipping element. Consequently, the three-dimensional stability of the optical communication module, the overall coupling performance of the optical communication module and the product yield of the optical communication module are all enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical communication module, comprising:
a substrate comprising at least two transmitter/receiver chips, an optical alignment region, at least one glue-guiding groove, and plural contact parts, wherein said at least one glue-guiding groove and said plural contact parts are disposed in said optical alignment region, and each of said transmitter/receiver chips comprises plural optoelectronic units with respective alignment marks, and;
a lens carrier comprising a frame and a lens array, wherein said frame comprises plural additional contact parts corresponding to said contact parts of said substrate, and said lens array comprises plural lens units corresponding to respective optoelectronic units of said transmitter/receiver chips of said substrate; and
a ferrule coupled with said lens carrier,
wherein said alignment marks of said optoelectronic units are passively aligned with corresponding lens units, so that said lens carrier and said substrate are precisely aligned with each other and combined together, wherein after said lens carrier and said substrate are combined together, said ferrule and said lens carrier are combined together, so that a precise optical communication path is constructed.

2. The optical communication module according to claim 1, wherein each of said contact parts comprises a first contact part with a first extension structure and a second contact part with a second extension structure, wherein said glue-guiding groove is defined by said first extension structure, said second extension structure and said substrate.

3. The optical communication module according to claim 1, wherein said lens carrier further comprises a central plate, and said lens array is disposed on said central plate.

4. The optical communication module according to claim 3, wherein an inner space of said frame is divided by said central plate into a protecting space and an insertion space.

5. The optical communication module according to claim 4, wherein said central plate further comprises at least one positioning part, wherein said position part is a guide pin extended toward said insertion space.

6. The optical communication module according to claim 4, wherein said ferrule comprises a main body and an optical cable, wherein a size of said main body of said ferrule match a size of said insertion space of said lens carrier.

7. The optical communication module according to claim 6, wherein said ferrule further comprises at least one guiding part corresponding to at least one positioning part of said lens carrier.

8. The optical communication module according to claim 6, wherein said ferrule further comprises plural optical cable terminals corresponding to said lens units of said lens carrier.

9. The optical communication module according to claim 1, wherein said frame of said lens carrier has plural first engaging structures.

10. The optical communication module according to claim 9, further comprising a clipping element, wherein said clipping element has plural second engaging structures corresponding to said first engaging structures of said lens carrier, wherein said first engaging structures and said second engaging structures are respectively engaged with each other.

11. A method for assembling an optical communication module, said method comprising steps of:
- (a) providing a substrate, wherein said substrate comprises at least two transmitter/receiver chips, an optical alignment region, at least one glue-guiding groove, and plural contact parts, wherein said at least one glue-guiding groove and said plural contact parts are disposed in said optical alignment region, and each of said transmitter/receiver chips comprises plural optoelectronic units with respective alignment marks;
- (b) providing a lens carrier comprising a frame and a lens array, wherein said frame comprises plural additional contact parts corresponding to said contact parts of said substrate, and said lens array comprises plural lens units;
- (c) aligning said optoelectronic units of said substrate to respective lens units of said lens carrier, so that said lens carrier is placed on said substrate, and monitoring whether said alignment marks of said optoelectronic units are aligned with respective lens units, thereby achieving precise optical alignment;
- (d) performing a glue-dispensing process to dispense a glue material into at least one glue-guiding groove of said substrate, so that said lens carrier is securely fixed on said substrate via said glue material; and
- (e) inserting a ferrule into an insertion space of said lens carrier, so that said ferrule is connected with said lens carrier and a precise optical communication path is constructed.

* * * * *